(No Model.)

C. P. THAYER.
POCKET KNIFE.

No. 445,509. Patented Jan. 27, 1891.

WITNESSES
M. C. Thayer.
J. P. Loud

INVENTOR
C. P. Thayer.

UNITED STATES PATENT OFFICE.

CLIFFORD P. THAYER, OF HOLBROOK, MASSACHUSETTS.

POCKET-KNIFE.

SPECIFICATION forming part of Letters Patent No. 445,509, dated January 27, 1891.

Application filed April 3, 1890. Serial No. 346,460. (No model.)

*To all whom it may concern:*

Be it known that I, CLIFFORD P. THAYER, of Holbrook, in the county of Norfolk and State of Massachusetts, have invented a new and useful Improvement in Clasp-Knives, of which the following is a full, clear, and exact description.

This invention relates to an improved device for opening or unclasping the knife, by means of which device the blade may be quickly and easily prepared for use regardless of the power of the spring or the size of the knife, and without the use of the nail, the unclasping being accomplished by the use of the fingers alone.

The invention consists in the novel construction and combination of parts, as will be hereinafter particularly described, and defined in the claim.

Reference is to be had to the accompanying drawings, forming a part of this specification, in which similar figures of reference indicate corresponding parts in all the views.

Figure 1:
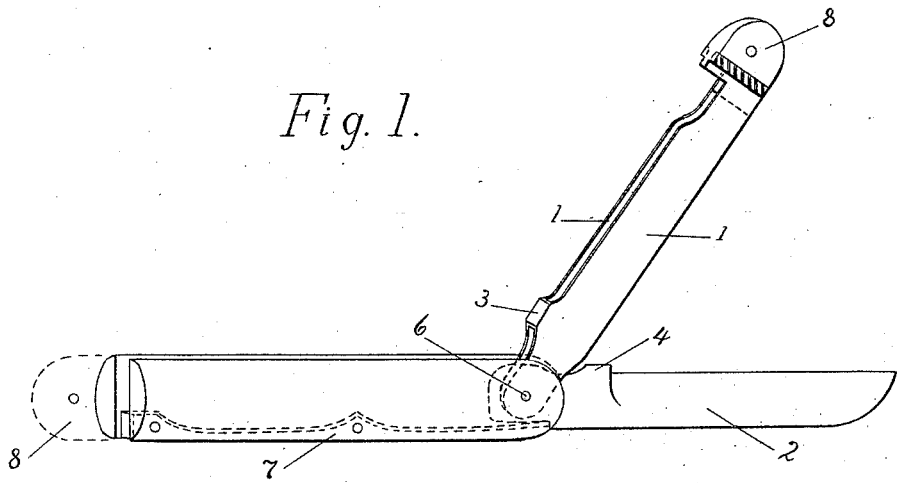
Figure 2:
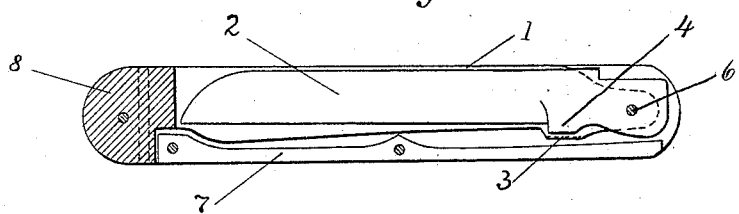
Figure 3:
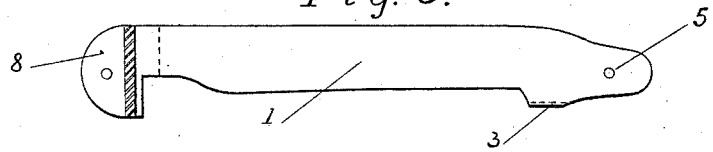

Figure 1 is a view of a knife provided with a lifting or opening device constructed in accordance with this invention, the blade being fully open and the lifter carried to that point from which the blade will be thrown open by the action of the spring. Fig. 2 is a view of a vertical section of a knife and my improvement on a longitudinal line drawn through the ends of the knife at the side of the blade, the lifter and blade both being closed. Fig. 3 is a perspective view of my improvement detached from the knife.

My invention includes, essentially, two plates 1 1, which when the knife is closed lie between the sides which form the frame of the knife parallel with the blade 2, one on each side thereof. The said plates are connected by a transverse section 3, which passes under and against the nib 4 of the blade, as shown in Fig. 2, the transverse section being an integral part of the plates 1 1, the whole being formed from one piece of metal. The plates 1 1 are perforated at the end 5, as shown in Fig. 3, to allow the passage of the pivot 6, upon which turns the blade 2, and which serves as a fulcrum for the lifter or lever formed by the plates 1 1 with the transverse section 3 and the knob 8. The plates 1 1 extend in most knives to the end opposite the pivot 6, being shaped so as to pass over the end of the spring 7 and ending in any device suitable for an outside finish, as shown by the knob 8, though in some varieties they would terminate at or near a point midway between the ends of the knife, ending either singly or jointly in any device suitable for an outside finish. Now if, when the blade is closed, the knob 8, Fig. 1, (represented as closed by the broken line,) be grasped with the fingers and raised to the position shown by solid line, Fig. 1, the blade 2 will be raised by the transverse section 3 of the plates 1 1 coming in contact with the nib 4 of the said blade, and when the knob 8 reaches the position shown by solid line, Fig. 1, the blade 2 will be thrown open by the action of the spring 7. The knob 8 is then returned to its first position, as shown by broken line, Fig. 1, leaving the blade 2 ready for use, and is closed in the ordinary manner.

It will be seen that this device affords a quick and easy means of preparing the blade of a clasp-knife for use, and as the blade may, if desired, be entirely concealed within the handle it enhances the appearance of the knife and also prevents wear of the pocket. The work accomplished by the transverse section or sac could be accomplished, also, by two inclined planes inserted between the plates at the point of the blade, one on each side thereof, and when the knob was lifted they would grasp the double inclined plane of the blade and raise from the handle; but such a device would be much more costly and clumsy, and would perform less adequate service.

The device shown is of simple and durable construction and could be applied at slight cost, and is applicable to a variety of knives.

Having thus described my invention, what I claim as new, and desire to secure by Letters Patent, is—

In a clasp-knife, a lifting or opening device comprising, essentially, two parallel pivoted plates connected by a transverse section and terminating at one end in any device suitable for an outside finish, substantially as shown and described.

CLIFFORD P. THAYER.

Witnesses:
MAYNARD C. THAYER,
JAMES P. LOUD.